United States Patent

[11] 3,557,813

| [72] | Inventors | Charles R. Fegley<br>Laureldale;<br>Theodore L. Yoder, Reading, Pa. |
|---|---|---|
| [21] | Appl. No. | 728,268 |
| [22] | Filed | May 10, 1968 |
| [45] | Patented | Jan. 26, 1971 |
| [73] | Assignee | Western Electric Company, Incorporated<br>New York, N.Y.<br>a corporation of New York |

[54] CAM ACTUATED FLUIDIC TIMING SYSTEM
8 Claims, 11 Drawing Figs.

[52] U.S. Cl. .................................................. 137/81.5,
137/624.17, 73/54
[51] Int. Cl. .................................................. F15c 3/00
[50] Field of Search .................................................. 137/81.5,
624.18, 624.17; 73/54; 234/107

[56] References Cited
UNITED STATES PATENTS

| 3,228,602 | 1/1966 | Boothe | 137/81.5X |
| 3,258,118 | 6/1966 | Gesell | 137/81.5X |
| 3,292,648 | 12/1966 | Colston | 137/81.5X |
| 3,302,398 | 2/1967 | Taplin et al. | 137/81.5X |
| 3,350,003 | 10/1967 | Jackowski | 234/107 |
| 3,363,453 | 1/1968 | Erickson | 73/54 |
| 3,410,289 | 11/1968 | Dexter | 137/81.5 |
| 3,433,238 | 3/1969 | Nightingale | 137/81.5 |
| 3,443,575 | 5/1969 | Hughes | 137/81.5 |
| 3,451,409 | 6/1969 | Roche | 137/81.5 |

Primary Examiner—William R. Cline
Attorneys—H. J. Winegar, R. P. Miller and J. L. Landis

ABSTRACT: Fluidic cam sensing is achieved by sensing the peripheral surface of a timing cam by applying fluid through a duct against the peripheral surface. Different conditions of back pressure within the duct, as the timed portions of the peripheral surface of the cam pass thereby, are detected for controlling a solid state fluidic logic circuit in accordance with such conditions. A pneumatic device can be operated in accordance with such a fluidic logic circuit.

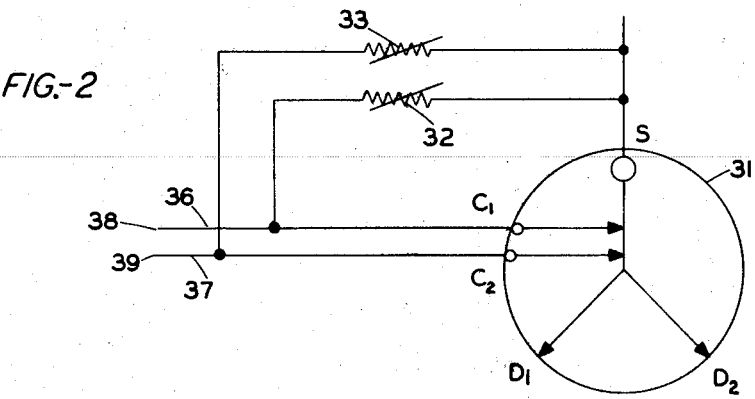
FIG.-2
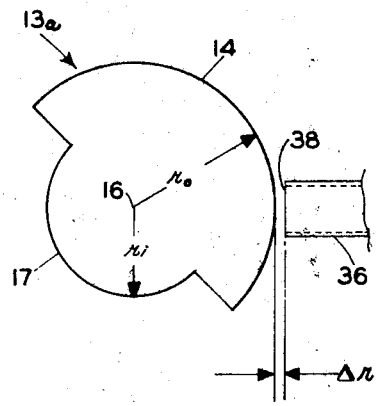
FIG.-3
| POSITION OF TIMING CAMS | | FLUID AMPLIFIER | | | |
|---|---|---|---|---|---|
| DISTANCE OF GAP BETWEEN LINE 36 AND PERIPHERAL SURFACE OF CAM 13a | DISTANCE OF GAP BETWEEN LINE 37 AND PERIPHERAL SURFACE OF CAM 13b | CONTROL PRESSURE | | OUTPUT PRESSURE | |
| | | $C_1$ | $C_2$ | $D_1$ | $D_2$ |
| $r_o - r_i + \Delta r$ | $r_o - r_i + \Delta r$ | 0 | 0 | $P_s$ | 0 |
| $r_o - r_i + \Delta r$ | $\Delta r$ | 0 | 1 | 0 | $P_s$ |
| $\Delta r$ | $r_o - r_i + \Delta r$ | 1 | 0 | 0 | $P_s$ |
| $\Delta r$ | $\Delta r$ | 1 | 1 | 0 | $P_s$ |
FIG.-4

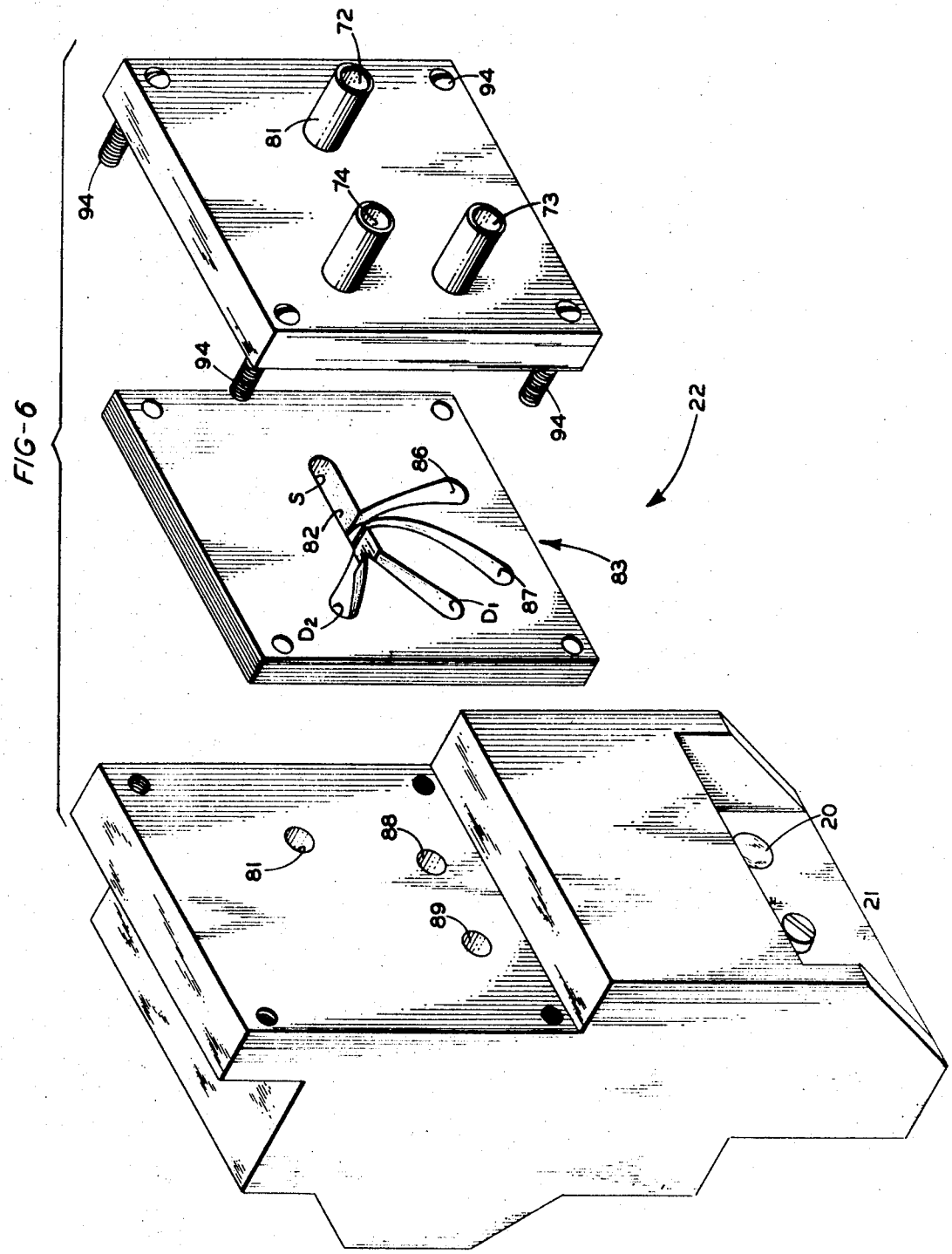

CAM ACTUATED FLUIDIC TIMING SYSTEM

BACKGROUND OF THE INVENTION

This invention relates generally to methods and apparatus for cam sensing. More particularly, the invention relates to cyclic timing apparatus including timing cams and fluidic cam sensors. The invention further relates to a cyclic timing apparatus for selectively controlling a variety of electrical and pneumatic devices. Accordingly, the general objects of the invention are to provide new and improved methods and apparatus of such character.

In the manufacture of components, such as semiconductor devices, for example, various operations can be performed which involve the control of both electrical and pneumatic circuits. A pneumatic circuit, for example, can be utilized for controlling the pinching off of the tubulation of a diode such as that described in a copending patent application by W. F. Esseluhn and C. R. Fegley, Ser. No. 713,683, entitled "Methods of and Apparatus for Sealing a Tubulation," filed Mar. 18, 1968, and assigned to the assignee of this application.

Generally, it is desired that the various electrical circuits and pneumatic circuits be operated in a predetermined timed sequence.

In the past, "multiple program" cycling timers were available wherein a plurality of cams were coupled to a common cam shaft. Each cam included a pair of cam members, each cam member having a 50 percent duty cycle. The various cam members were adjustable with respect to each other to provide the desired angle of operation, and with respect to other cam member pairs to provide the desired relative timing. The state of the cam members were detected by mechanical switches for controlling electrical circuits. Such a cycling timer, in the past, was versatile to the degree of being individually adjustable to meet respective program requirements. Though the electrical outputs of the cycling timer switches were directly connected to electrical circuits, some of the electrical circuits were utilized for indirectly controlling pneumatic circuits by means of suitable electric/pneumatic transducers.

By directly detecting the position of a pair of cam members by a solid state fluidic cam sensor for controlling a fluidic circuit, such as set forth by the teachings of this invention, various advantages accrue including: the elimination of a mechanical switch, which may be subject to failure; and the elimination of a solenoid and all electrical connections, such elimination of electrical connections is especially desirable in explosive atmospheres, such as hospital operating rooms and the like. Another advantage is the elimination of moving parts for clam detection.

SUMMARY OF THE INVENTION

Another object of this invention is to provide new and improved methods and apparatus for sensing timing cams.

It is a further object of this invention to provide new and improved methods and apparatus for fluidic cam sensing and for the detection of a timing cam by a solid state fluidic cam sensing module.

Still another object of this invention is to provide a cyclic timing apparatus for selectively controlling both electrical and pneumatic devices wherein fluidic cam sensing modules and mechanical switching cam sensing modules are interchangeable.

With these and other objects in view, the present invention contemplates a method of sensing the peripheral surface of a timing cam for controlling a pneumatic device by rotating the cam about its axis, applying fluid through a duct to a sensing orifice terminating at a fixed point located a small distance from the cam axis so that the fluid is directed against the peripheral surface of the cam, detecting the different conditions of back pressure within the duct as the two different portions of the timing cam surface pass by the fixed point, controlling a solid state fluidic logic circuit in accordance with such conditions, and operating a pneumatic device in accordance with the state of the logic circuit.

The duct and the fluidic logic circuit can be incorporated in an integral housing having a supply orifice, two discharge orifices, and two sensing orifices, so that the housing is especially adaptable for sensing the proximity of surfaces at the sensing orifices. The housing comprises therewithin, a fluidic OR logic means having a supply passage, a first discharge passage coupled to the first discharge orifice, a second discharge passage coupled to the second discharge orifice, a first control passage, and a second control passage, so interconnected so that when fluid is applied to the supply passage, in the absence of a critical pressure at either the first control passage or the second control passage, fluid from the supply passage passes through the first discharge orifice to the exclusion of said second discharge orifice, and, in the presence of a critical pressure present at either one of the control passages, fluid from the supply passage passes through the second discharge orifice to the exclusion of the first discharge orifice. Individual fluid carrying means are provided, each of which includes an input passage coupled to a pair of output passages. One output passage of a pair is coupled to a respective sensing orifice, and the other output passage of a pair is coupled to a respective control passage. Individual restriction means are utilized for coupling the supply duct to the individual input passages.

The aforesaid integral housing is particularly adaptable for sensing a pair of cam members, each of the sensing orifices for sensing a specific cam member, whereby the invention contemplates utilizing such a fluidic sensing mechanism with a cyclic timing apparatus including the various cam members as set forth above.

In another embodiment of the invention, a cyclic timing apparatus for selectively controlling a variety of both electrical and pneumatic devices is described, including a cam shaft, and a plurality of pairs of cam members wherein each cam member has a 50 percent raised and a 50 percent recessed peripheral surface. Each cam member is adjustable with respect to the cam shaft and with respect to the other cam member of the pair and with respect to the other pairs so as to be programable as desired. The cyclic timing apparatus includes a first set of electrical cam sensing modules for controlling electrical devices, and a second set of fluidic cam sensing modules for controlling pneumatic devices. The modules of each set have substantially the same basic dimensions so as to be interchangeable. A frame is provided which has bearings for supporting the cam shaft, the frame being further adapted to interchangeably hold a like plurality of modules for the sensing of the pairs of cam members.

BRIEF DESCRIPTION OF THE DRAWINGS

Other objects, advantages and features of the invention will become apparent by reference to the following detailed specification and drawings of specific embodiments thereof, wherein:

FIG. 2 is a logical representation for the fluidic cam sensing module used in the embodiment of FIG. 1;

FIG. 3 shows, in portion, the cooperation of the sensing orifice of a fluidic sensing apparatus with a timing cam;

FIG. 4 is a truth table which shows the relationship of the output of a fluid amplifier as a function of the position of the timing cams;

FIG. 6 is an exploded view of still another embodiment of the invention illustrating a fluidic cam sensing module in an integral housing;

DESCRIPTION OF OVERALL SYSTEM

Figure 1:
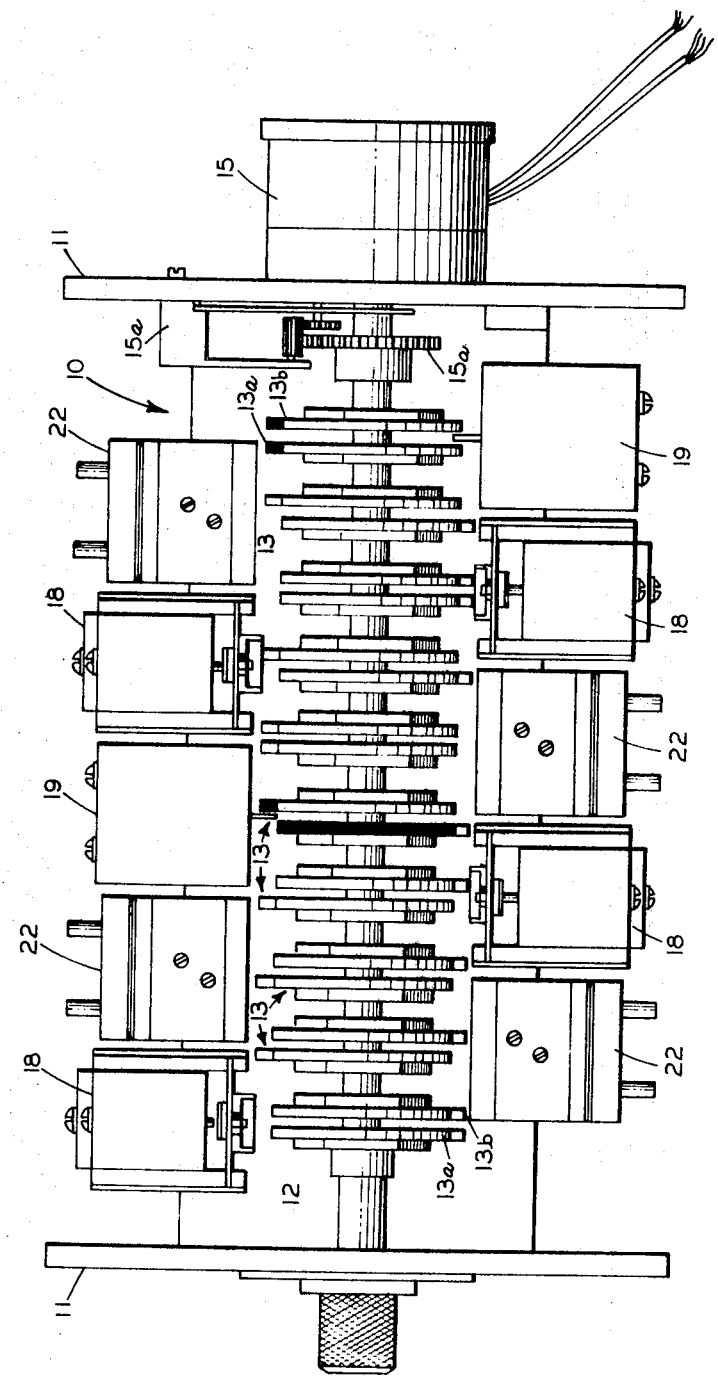
FIG. 1 is a plan view of cyclic timing apparatus in accordance with one embodiment of the invention wherein a combination of conventional, mechanically actuated cam sensing modules, fluidic cam sensing modules, and photoelectric cam sensing modules are utilized.

An adjustable cyclic timer, suitable for synchronizing a plurality of timed operations, is shown in plan view in FIG. 1. It includes a housing 10 having a pair of end brackets 11–11 with suitable bearings therewithin for supporting a cam shaft 12. The cam shaft 12 supports a plurality of timing cams 13–13, each cam including two cam members 13a–13b which are adjustable with respect to each other and with respect to other pairs of cam members.

A driving member, such as a motor 15 is coupled to drive the cam shaft 12. Intermediate gearing 15a can be provided to vary the cycle speed in known manner by means of a friction clutch 15b which permits manual rotation of the cam shaft 12 while the motor shaft remains stationary.

Each cam member 13a has a peripheral surface (FIG. 3) including a first substantially 180° portion 14 remote from the axis 16 by a radial distance $r_0$ and a second substantially 180° portion 17 of its peripheral surface being closer to the axis 16. The second portion surface 17 is disposed a radial distance $r_i$ from the axis 16. Likewise, each cam member 13b is similarly constructed.

The cyclic timer shown in FIG. 1 includes a plurality of mechanically actuated electrical switching cam sensing modules 18–18 for sensing the states of their respective cams 13. Each module 18 contains a protrusion thereon which fits within a locating hole (not shown) of the housing 10. A machine screw affixes the module 18 to the housing 10 in known manner.

The cyclic timer, just described, including the housing, the cam shaft with adjustable cam members thereon, and the mechanically actuated electrical switching cam sensing modules affixed to the housing, is well known in the art.

However, as shown in FIG. 1, a photoelectric cam sensing module 19, and a plurality of fluidic cam sensing modules 22–22 (in addition to the mechanical modules 18–18) are utilized in the cyclic timer for sensing some of the respective cams 13–13. The photoelectric module 19 and the fluidic sensing modules 22 have substantially the same dimensions as the mechanical modules 18 so as to provide for compatibility and interchangeability. Each module 22, for example, includes a corresponding protrusion 20 (FIG. 6) in its base for fitting within the locating hole of the housing 10. The module 22 is affixed to the housing by a machine screw 21 in a similar manner to that of the mechanical module 18.

Thus, with the embodiment of FIG. 1, a cyclic timing apparatus is shown which can be used for selectively controlling a variety of devices, both electrical and pneumatic in character. The mechanically actuated electrical cam sensing modules 18–18 can be used for controlling electrical devices. The fluidic cam sensing modules 22–22 can be used for controlling pneumatic devices. Each of the modules 18 and 22 have substantially the same basic dimensions so that the housing 10 can interchangeably hold a plurality of various modules 18—22 for sensing the various cams 13–13.

OPERATION OF THE FLUIDIC SENSING APPARATUS

To better understand the invention, the operation of the fluidic sensing apparatus used in accordance with one embodiment of the invention will be initially described. Referring to FIG. 2, there is shown a fluidic OR circuit 31 having a supply passage S and a pair of discharge passages D1 and D2. The state of the OR circuit 31 can be controlled by signals present at the control passages C1 and C2. Such an OR circuit 31, for example, is commercially available, such as the General Electric OR/NOT Parallel three-way valve, Type No. CR1A0AB-10301A (using only two of the three control passage ports).

The OR circuit 31 operates as follows: In the absence of a critical control pressure at any of the control passages C1 or C2, fluid flows from the supply passage S out through the discharge passage D1 to the exclusion of the discharge passage D2. However, when at least a critical pressure is present at any or both control passages C1, C2, an output flow is obtained from the other discharge passage D2. When the critical pressure is removed, the output flow of fluid reverts back to the first discharge passage D1.

In accordance with one feature of the invention, fluid from the main which supplies the supply passage S is supplied through individual regulators 32—33 to intermediate taps respectively of lines 36—37. The lines 36—37, at one end respectively, are coupled to the control passages C1, C2 of the OR circuit 31 and, at their other ends, the lines 36 and 37 are coupled to sensing orifices 38—39. 39.

The sensing orifices 38, 39 are located in close proximity to the timing cams (FIG. 3) so that, when the surface 14 of the timing cam approaches the sensing orifice 38 of the line 36, a short distance $\Delta r$ exists between the surface 14 and the orifice 38. Preferably, the distance $\Delta r$ may vary from actual touching ($\Delta r =$) up to and including 0.030 inch.

FIG. 4 is a truth table which sets forth the conditions of the fluidic circuit shown in FIG. 2 with respect to the various states of the timing cams shown, in part, in FIG. 3. Thus, as the surfaces 17–17 of both timing cams 13a and 13b provide gaps that are fairly broad to its respective positioned lines 36, 37, the pressures at the orifices 38—39 approach zero; hence, the pressures at the corresponding control passages C1, C2 are below the critical pressure, or 0 in Boolean logic terminology. Thus, fluid flows from the supply passage S out through the discharge passage D1, providing a controlled pressure Ps, at the output thereof.

Continuing, as the timing cam 13 rotates, so that passage surface 14 of either or both cam members 13a, 13b approach the sensing orifices 38, 39 of the respective lines 36, 37, the small gap $\Delta r$ becomes presented to one or both of the lines 36—37, creating a condition for back pressure to be presented to the corresponding control passage C1, C2. The back pressure signal, so created, is above the critical pressure (logically at unity), to cause the switching of the logic circuit 31 so that fluid flows from the supply passage S out through the discharge passage D2.

ACTUATION OF PNEUMATIC DEVICE IN ACCORDANCE WITH ANOTHER EMBODIMENT OF THE INVENTION

Figure 5:
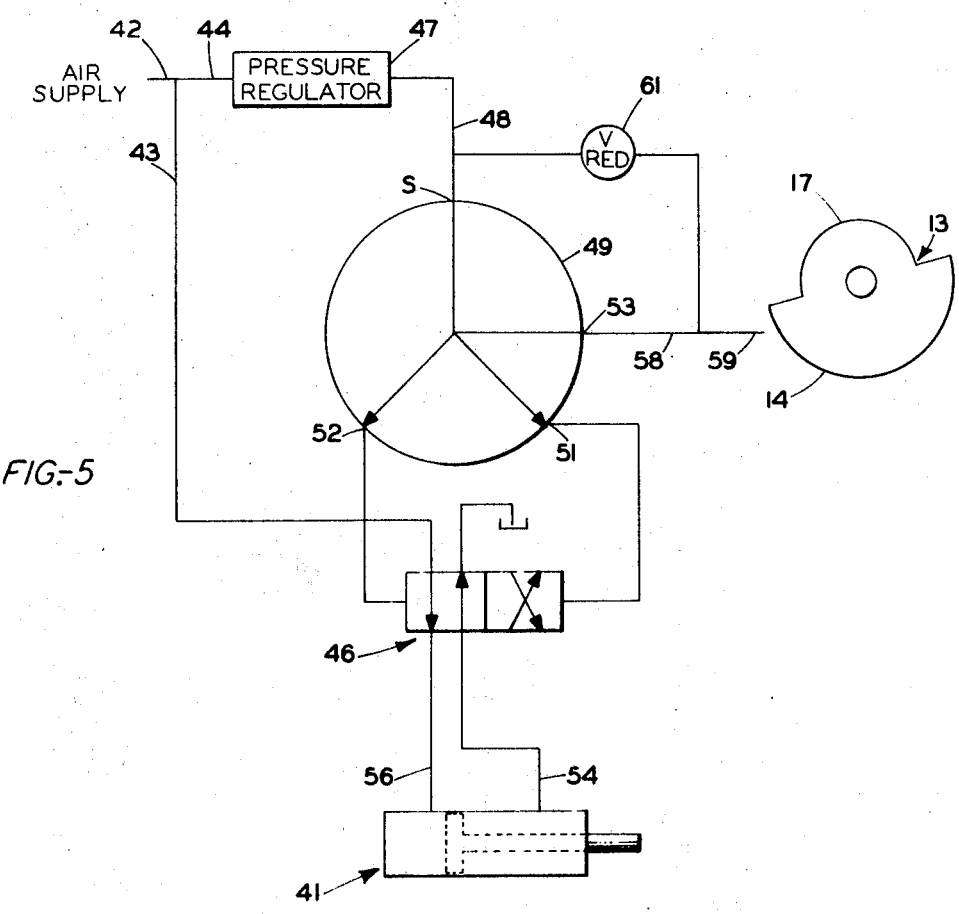
FIG. 5 is a schematic diagram of pneumatic apparatus in accordance with another embodiment of the invention for operating a pneumatic device.

Pneumatic devices, such as a pinch trim welding station 41 (shown in FIG. 5, and described in the Esseluhn Fegley application, supra), can be controlled by fluidic cam sensing apparatus which senses the timing cam 13. Air under pressure flows from a suitable supply through a supply line 42 which branches off into a first line 43 and to a second line 44. The first line 43 is coupled to an input of a valve 46 having outputs which are selectively coupled to the pneumatic station 41 for driving it in one of two directions. The line 44 is coupled through a pressure regulator 47 and hence through a line 48 to a supply terminal S of a fluidic proportional amplifier 49. In the absence of a critical pressure present at the control terminal 53 of the fluidic amplifier 49, air flows through the line 48 through the supply terminal S of the fluidic proportional amplifier 49 and out through the "Off" discharge terminal 51, to drive the valve 46 to the left so that air is applied through the lines 42, 43, and through the valve 46, to provide air along a line 54 to the pinch trim pneumatically operated welding station 41 for driving the piston therein to the left (as viewed in FIG. 5).

However, when a critical pressure is present at the control terminal 53, air flows through the lines 42, 44, the pressure regulator 47, the line 48, the supply terminal S of the fluidic proportion amplifier 49, and out of the "On" discharge terminal 52, to drive the valve 46 in the rightmost direction, whereby air flows through the lines 42, 43, through the valve 46, to the line 56 to drive the piston in the pinch trim station 41 to the right.

The fluidic proportional amplifier 49 has its control terminal 53 coupled, via a line 58 which terminates at an orifice 59, so as to sense the control cam 13. The orifice 59 is fixed at a point suitable for sensing the peripheral surface of the timing cam 13 in a manner similar to that described in connection with FIG. 3.

A pressure reducing valve 61 is coupled between the line 48 and a tap connection on the line 58 for supplying air in order to sense the control cam 13. Hence, when the orifice 59 is in close proximity to the outer peripheral surface 14 of the timing cam 17, pressure at the control terminal 53 is high, whereby air flows out of the "On" discharge terminal 52 of the amplifier 49 which drives the valve 46 to the right, so that the pneumatic pinch trim station 41 is actuated by air supplied along the lines 42, 43, and 56. As the timing cam 13 rotates, so that its inner peripheral surface 17 passes by the fixed point defined by the location of the orifice 59, pressure at the control terminal 53 drops toward zero, below the critical pressure necessary to keep the amplifier 49 in the "On" state, whereby air flows through the amplifier 49, out through the "Off" discharge terminal 51 to drive the valve 46 to the left so that air flows through the lines 42, 43, and 54 to drive the pinch trim station 41 to the deactuated direction.

DESCRIPTION OF INTEGRAL CAM SENSING MODULE IN ACCORDANCE WITH YET ANOTHER EMBODIMENT OF THE INVENTION

FIG. 6 is an exploded view of a fluidic cam sensing module in accordance with another embodiment of the invention. The module shown in FIG. 7 can be assembled with bolts, as illustrated, or can be constructed as an integral unit from suitable material, such as plastic. The module contains no moving parts, other than the fluid which passes therethrough.

The module 22 as shown in FIGS. 6 and 7A—D includes a supply orifice 72, a first discharge orifice 73, and a second discharge orifice 74. Preferably, the supply orifice 72 and the discharge orifice 73, 74 are located along one face of the cam sensing module 22. The module 22 also includes a pair of sensing orifices 76—77 preferably located at the opposite face of the module 71. Air normally passes from the supply orifice 72 through a duct 81. The duct 81 is coupled, first, to the supply passage 82 of an OR fluidic logic circuit 83. The OR circuit 83 has its discharge passages coupled to the discharge orifices 73, 74, respectively.

The OR circuit 83 is controlled by pressure present at either one of its control passages 86—87.

Second, the duct 81 is coupled to an intermediate tap on a first linear passage 88, via a first adjustable restriction valve 91. The linear passage 88 joins the first sensing orifice 76 to the first control passage 86. The valve 91 can be adjusted to bring the fluidic pressure to optimum values, which values vary in accordance with various parameters, including the shape of specific cams.

Third, in a similar manner, the duct 81 is coupled via a second adjustable restriction valve 92 to a second linear passage 89 which joins the second sensing orifice 77 to the second control passage 87 of the OR circuit 83.

Figure 7A:
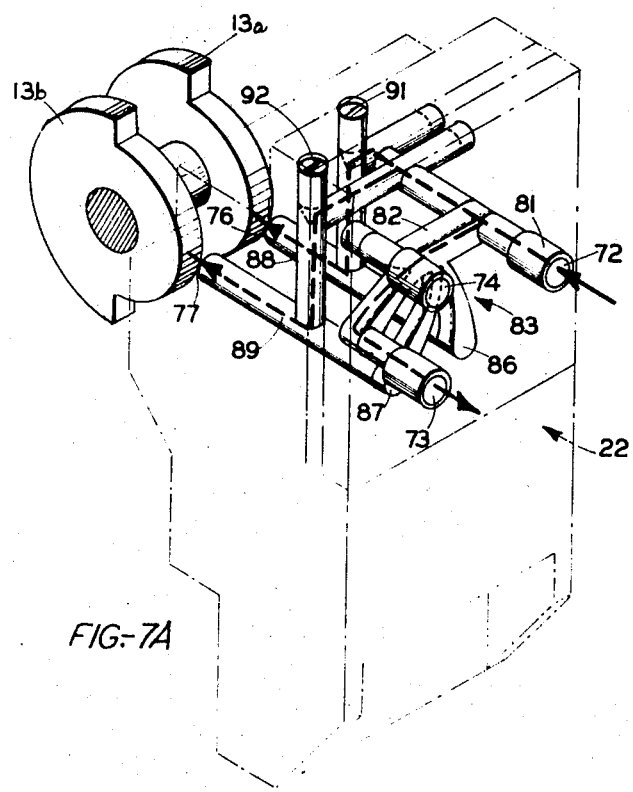
FIGS. 7A—D are perspective views of the fluidic cam sensing module shown in FIG. 6 showing fluid flow in accordance with various states of associated timing cams, the housing being shown in phantom lines and the passages therewithin being shown in solid lines so as to more clearly illustrate the invention.

As both extended cam surfaces 14 of the control cam members 13a, 13b recede away from the sensing orifices 76, 77 of the module 22 so that the recessed peripheral surface 17 of both cam members 13a, 13b are presented to the sensing orifices 76, 77, air can freely flow through the supply orifice 72 of the cam sensing module 22 out through the sensing orifices 76, and 77 as shown in FIG. 7A. The pressure at the control passages 86 and 87 drop toward zero, below the critical pressure, whereby air flows through the supply terminal 72, through the OR circuit 83, and out through the first discharge orifice 73.

Figure 7B:
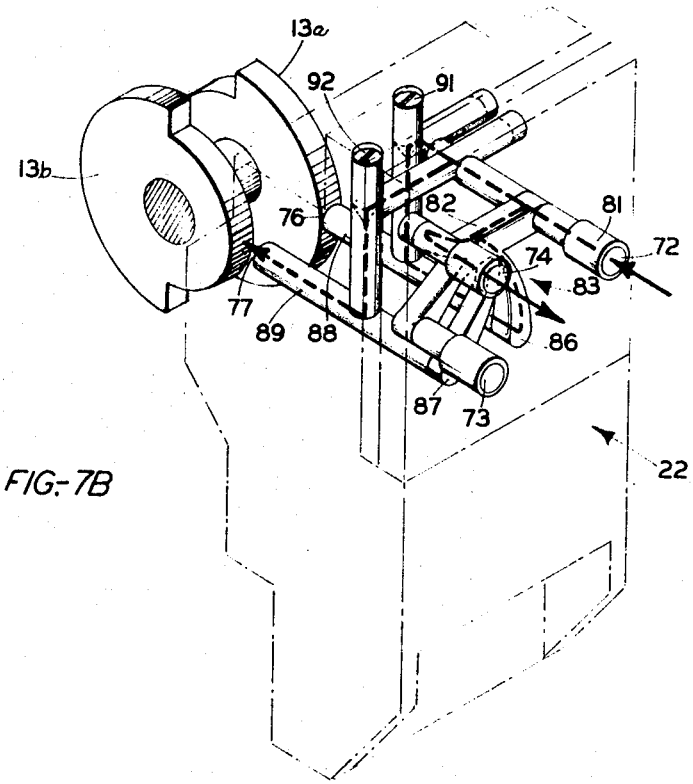

As illustrated in FIG. 7B, as the surface 14 of one 13a of the cam members 13a, 13b approaches the sensing orifice 76 of the fluidic cam sensing module 22, the flow of air is diverted so that the pressure at the first control passage 86 increases, causing the air supplied to the first discharge orifice 73 to be switched to the second discharge orifice 74. Hence, as shown in FIG. 7B, air freely flows through the supply orifice 72 and out through the second discharge terminal 74. In addition, some air flows out through the second sensing orifice 77 freely against the recessed surface 17 of the associated cam member 13b.

Figure 7C:
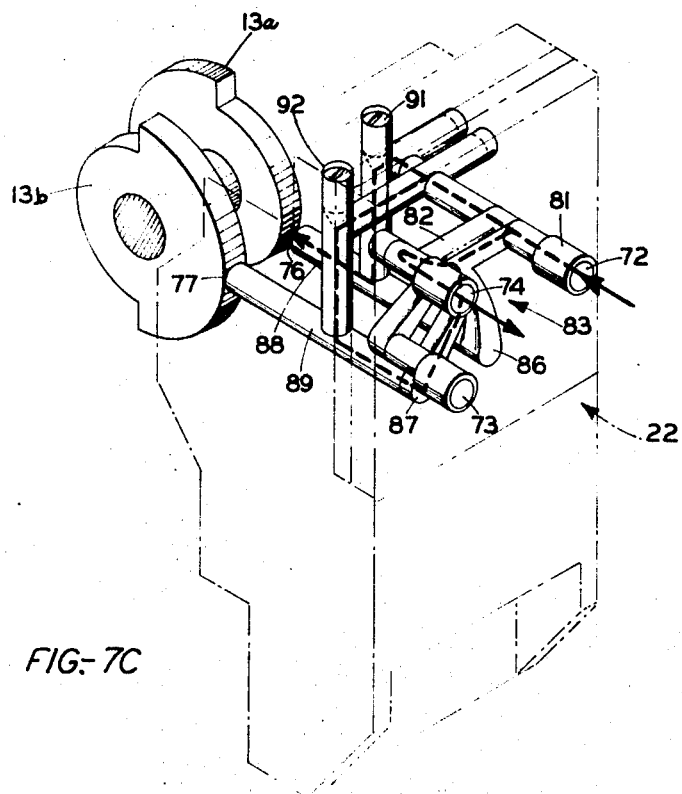
Figure 7D:
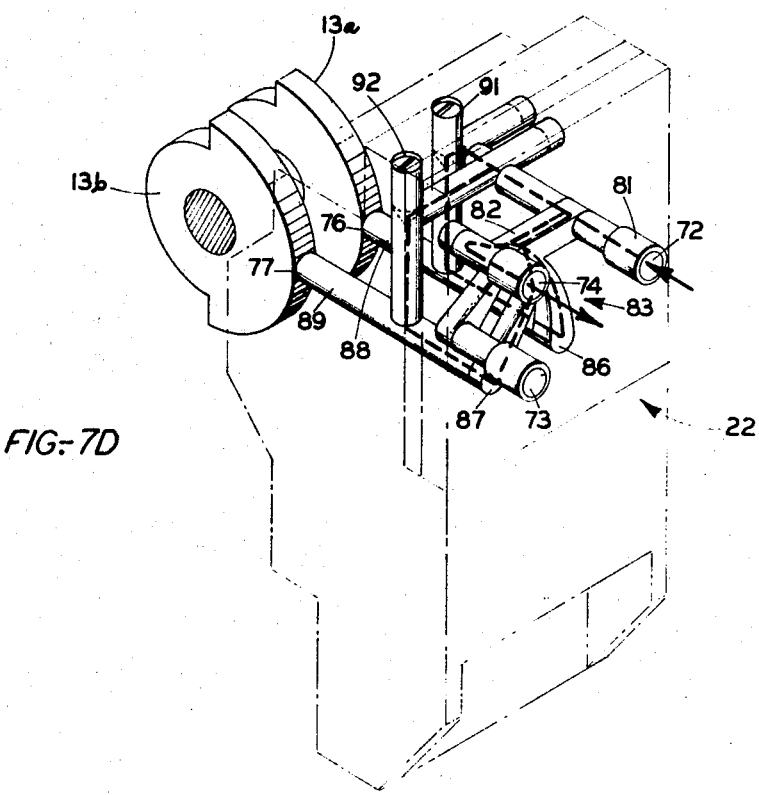

In a similar manner, when the cam member 13b has its peripheral surface 14 in close proximity to the second sensing orifice 77, the pressure at the control passage 87 increases, causing the fluid flow through the OR circuit 83. To be diverted through the second discharge orifice 74 as shown in FIG. 7C.

When the outer peripheral surfaces 14–14 of both cams 13a, 13b pass by the sensing orifices 76, 77 of the fluidic cam sensing module 22, the pressure at the orifices 76, 77 increases, whereby the pressure at the control passages 86, 87 both increase. Hence, the air flows from the supply orifice 72 through the OR circuit 83 and out the second discharge terminal 74.

CONSTRUCTION OF THE INTEGRAL HOUSING IN ACCORDANCE WITH ONE FEATURE OF THE INVENTION

Referring to FIG. 6, there is shown an exploded view of the fluidic module 22, including the protrusion 20 on the module suitable for insertion within the housing 10 of a system apparatus. A hole is provided in its base for receiving a machine screw 21 therewithin. The device shown in FIG. 6 in includes screws 94–94 for assembling an OR circuit 83 therewithin to form an integral unit. The OR circuit 83 can be any conventional fluidic logic OR circuit, such as those constructed of homogenous material, as glass and plastic, or those such as the metallic wafer type manufactured by the General Electric Company.

The OR circuit 83, shown in FIG. 6, illustrates a logical circuit for controlling the flow of fluid therewithin. Air is supplied from the supply orifice 72, through the supply terminal S and hence through the supply passage 82 of the OR circuit out to the discharge terminals D1 and D2 and then to the discharge orifices 73, 74 of the module. Fluid may be present at either one of the control terminals 86, 87.

Thus, FIGS. 7A—7D illustrate the operation of the fluidic circuit: As the shaft 12 rotates, the conditions in the OR circuit are cyclically varied. When the inner peripheral surface 17 of both cams 13a, 13b are presented before the orifices 76 and 77 of the passageways or ducts 88 and 89, air freely flows from the supply orifice 72 out through the orifices 76, 77 whereby the pressure in the control terminals 86 and 87 decreases. Air flows from supply orifice along the passage 82 out through the discharge orifice 73.

As the shaft 12 rotates, so that the peripheral surfaces 14 of one or both cam members 13a, 13b tend to block the passage of air through the orifice 111 and/or 112, the pressure at the corresponding control terminal 86, 87 increases, whereby air flows from the supply orifice 72 out through the discharge orifice 74.

PHOTOELECTRIC SENSING SYSTEM

Figure 8:
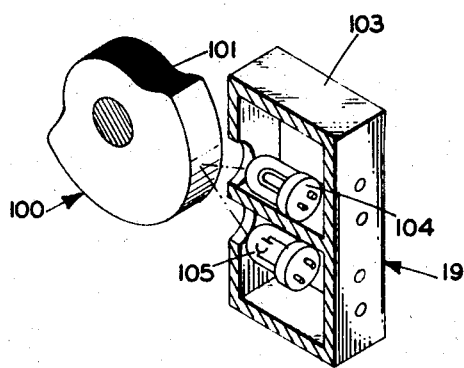
FIG. 8 is a partial view illustrating a solid state photoelectric cam sensing detector.

FIG. 8 is a partial view of a "solid state" photoelectric cam sensing apparatus including a cam member 100 having an inner peripheral darkened surface 101 which may, for example, be painted black. The outer peripheral surface 102 of the cam member 100, adapted to have high reflectivity, may be coated with a highly reflective material such as silver or white paint. A light/photocell detecting module 19, "solid state" in character in that no moving parts are incorporated therewithin, includes a housing 103 which contains a lamp 104, shown in an operative condition. The lit lamp 104 provides light out of the housing 103 against the peripheral surfaces 101, 102 of the cam member 100. The housing 103 also contains a photocell detector 105, having suitable leads coupled thereto and out through the housing 103 to external circuitry (not shown). The photocell detector 105 is actuated when the highly reflective peripheral surface 102 of the cam member 100 passes by the housing 103. As the cam member 100 rotates, so that the inner darkened surface 101 of the cam member is presented to the housing 103, the photocell 105 becomes inactive, providing no output therefrom.

FIG. 1 illustrates the compatibility of a mechanical switching cam sensor 18, a light/photocell cam sensor 19 and a fluidic cam sensor 22 for sensing timing cams having extended and recessed peripheral surfaces, especially where one of the two surfaces is darkened and the other is highly reflective. Such timing cams can be sensed by any of the three aforesaid types of sensors, thus providing for high interchangeability.

DEFINITIONS

By the term "critical pressure," used throughout the specification, is meant that pressure or pressures at which switching of the fluidic "OR" logic circuit takes place. Such critical pressure may vary dependent upon the various parameters, such as the configuration of the OR logic circuit, per se, and the supply pressure.

The term "solid state," as used herein, refers to devices having no moving parts.

The term "fluid," as used herein, includes both gases and liquids. In view of its cost and accessibility, air is the preferred fluid.

CONCLUSION

"Fluid" sensing of cams can be achieved by the integral fluidic cam sensing module; or by a separate regulator, a separate fluidic or gate, and separate restriction valves in combination. A programable timer in accordance with this invention can use both mechanical cam sensors and fluidic cam sensors, or, alternatively, a combination of "solid state" devices using both photoelectric and fluidic sensing modules with or without mechanical cam sensors, as set forth in FIG. 1.

By independently adjusting the pair of cam members 13a, 13b, from 2 percent to 98 percent duty cycle can be obtained. A plurality of cams housed in a small amount of space on a common cam shaft can be sensed, as taught herein, for controlling both electrical and pneumatic devices.

In accordance with one embodiment of the invention, satisfactorily constructed by the applicants, desirable results were obtained with the following values:

| | |
|---|---|
| Pressure Regulator 47 _____p.s.i__ | 8 |
| Restriction Valve 61 (output) _____p.s.i__ | 2 |
| Pressure to Pneumatic Device 41 _____p.s.i__ | 30 |
| Fluid _____ | Air |
| Cam 14, Inner Peripheral Surface 17: | |
|    Duration _____percent__ | 49 |
|    Radius $r_i$ _____inch__ | 0.64 |
| Outer peripheral surface 14: | |
|    Duration _____percent__ | 49 |
|    Radius $r_o$ _____inch__ | 0.72 |
| Transitional Surfaces _____percent__ | 2 |
| Distance between outer surface of cam 14 and sensing orifice $\Delta r$ _____inch__ | .005 |

It should be apparent that the above-defined embodiments are simply illustrative of the principles of the invention and numerous modifications may be devised without departing from the spirit and scope of the invention. For example, for permanent operation, a restriction valve need not be adjustable for varying the pressure at the sensing orifice. For a given set of permanent conditions, a fixed constriction in the module can be used in lieu of an adjustable valve.

We claim:
1. A cyclic timing apparatus comprising:
   a. a cam shaft;
   b. a first cam member, secured to said cam shaft so as to be rotatable about its axis, having a peripheral surface characterized by a first, substantially 180°-portion thereof being remote from said axis by a radial distance $r_o$, and a second, substantially 180°-portion of the peripheral surface being closer to said axis than said first portion surface, said second portion peripheral surface being disposed a radial distance $r_i$ from said axis;
   c. a second cam member, adjustably secured to said cam shaft so as to be rotatable about its axis and adjustable with respect to said first cam member, having a peripheral surface characterized by a first, substantially 180°-portion thereof being remote from said axis by said radial distance $r_o$, and a second, substantially 180°-portion of the peripheral surface being closer to said axis than said first portion surface, said second portion peripheral surface being disposed said radial distance $r_i$ from said axis; and
   d. means responsive, in one sense, to the proximity of either one of said first portion peripheral surfaces to a pair of fixed points, each fixed point being located $r_o, + \Delta r$ from said cam axis, each fixed point being associated with its respective cam member, when either one of said fixed points respectively is located $\Delta r$ from its respective first portion surface, and, in another sense, to the proximity of both of said second portion peripheral surfaces to said pair of fixed points, respectively, when each of said fixed points is located $r_o, - r_i + \Delta r$ from its respective second portion surface, said means including:
      1. fluid OR logic means having a supply passage, a first discharge passage, a second discharge passage, a first control passage, and a second control passage, so interconnected so that when fluid is supplied to said supply passage, in the absence of a critical pressure present at either said first control passage or said second control passage, fluid from said supply passage passes through said first discharge passage to the exclusion of said second discharge passage and, in the presence of said critical pressure present at either one of said control passages, fluid from said supply passage passes through said second discharge passage to the exclusion of said first discharge passage;
      2. first fluid carrying means including an input passage, adapted to provide a controlled pressure of fluid, coupled to both: (a) a first output passage coupled to terminate at the associated fixed point for sensing the peripheral surface of said first cam member, and (b) a second output passage coupled to said first control passage; and
      3. second fluid carrying means including an input passage, adapted to provide a controlled pressure of fluid, coupled to both: a first output passage coupled to terminate at the associated fixed point for sensing the peripheral surface of said second cam member, and a second output passage coupled to said second control passage; whereby
         i. as the first portion peripheral surface of either of said cam members passes by its respective fixed point, fluid flow from the input passage of the corresponding fluid carrying means out of the associated first output passage decreases, thereby increasing the pressure in the corresponding second output passage and thus the coupled control passage above said critical pressure so that fluid passes from said supply passage to said second discharge passage, and
         ii. as the second portion peripheral surfaces of both of said cam members passes by their respective fixed points, fluid flow from the input passages of both fluid carrying means to both the first fluid carrying means first output passage and the second fluid carrying means first output passage increase, thereby decreasing the pressure in the second output passages of both the first and second fluid carrying means, and hence the first and second control passages, below said critical pressure so that fluid passes from said supply passage to said first discharge passage.

2. The apparatus as recited in claim 1 wherein said fluid is air under pressure.

3. The apparatus as recited in claim 1 further comprising:
a first restriction valve coupled from said supply passage to said first fluid carrying means input passage to provide controlled pressure thereto; and
a second restriction valve coupled from said supply passage to said second fluid carrying means input passage to provide controlled pressure thereto.

4. The apparatus as recited in claim 3 wherein said fluid OR logic means, said first fluid carrying means, said second fluid carrying means, said first restriction valve, and said second restriction valve include a common housing so that said first control passage and said first fluid carrying means second output passage is common, and so that said second control passage and said second fluid carrying means second output passage is common.

5. The apparatus as recited in claim 1 wherein $0 < \Delta r < .030$ inch.

6. The apparatus as recited in claim 1 further comprising:
means for rotating the cam shaft;
means for supplying air to said supply passage; and
a pneumatically operated device coupled to at least one of said discharge passages, whereby said device is cyclically operated in accordance with the setting of the cam members with respect to each other.

7. A fluidic control unit, which comprises:
an integral housing having a supply orifice, a first discharge orifice, a second discharge orifice, a first sensing orifice, and a second sensing orifice; said housing being especially adapted for sensing the proximity of surfaces at said sensing orifices; said housing comprising therewithin:
1. fluidic OR logic means having a supply passage, a first discharge passage coupled to said first discharge orifice, a second discharge passage coupled to said second discharge orifice, a first control passage, and a second control passage, so interconnected so that when fluid is supplied to said supply passage, in the absence of a critical pressure present at either said first control passage or said second control passage, fluid from said supply passage passes through said first discharge orifice to the exclusion of said second discharge orifice, and, in the presence of said critical pressure present at either one of said control passages, fluid from said supply passage passes through said second discharge orifice to the exclusion of said first discharge orifice;

2. first fluid carrying means including an input passage coupled to both: a first output passage coupled to said first sensing orifice, and a second output passage coupled to said first control passage;

3. second fluid carrying means including an input passage coupled to both; a first output passage coupled to said second sensing orifice, and a second output passage coupled to said second control passage;

4 . a supply duct coupling said supply orifice to said supply passage;

5. first restriction means coupling said supply duct to said first fluid carrying means input passage; and 6. second restriction means coupling said supply duct to said second fluid carrying means input passage.

8. A cyclic timing apparatus for selectively controlling a variety of both electrical and pneumatic devices comprising:
a. a cam shaft;
b. a plurality of pairs of cam members:
each cam member having a peripheral surface characterized by a first, substantially 180°-portion thereof being remote from its axis by a radial distance $r_0$, and a second, substantially 180°-portion of the peripheral surface being closer to said axis than said first portion surface, said second portion surface being disposed a radial distance $r_i$ from said axis;
each cam member of a pair being adjustably secured to said cam shaft so as to be rotatable about its axis and adjustable with respect to the other cam member of the pair, and with respect to other pairs, so as to be programable as desired;
c. a first set of electrical cam sensing modules for controlling electrical devices;
d. a second set of fluidic cam sensing modules for controlling pneumatic devices, the modules of each of said sets having substantially the same basic dimensions so as to be interchangeable; and
e. a frame having bearings for supporting said cam shaft, said frame being adapted to interchangeably hold a like plurality of said modules for the sensing of said pairs of cam members.